United States Patent

Louth

[15] 3,654,387

[45] Apr. 4, 1972

[54] VIDEO TAPE RECORDER SYNCHRONIZING SYSTEM

[72] Inventor: Kenneth Louth, Auburn, Calif.

[73] Assignee: RCA Corporation, New York, N.Y.

[22] Filed: June 23, 1969

[21] Appl. No.: 835,396

[30] Foreign Application Priority Data

Mar. 21, 1969 Great Britain......................14,947/69

[52] U.S. Cl.......................................178/6.6 P, 179/100.2 T

[51] Int. Cl..................G11b 15/28, G11b 15/52, H04n 5/78

[58] Field of Search............178/6.6 A, 6.6 AP, 6.6 P, 6.6 A; 179/100.2 B, 100.2 T

[56] References Cited

UNITED STATES PATENTS

| | | | |
|---|---|---|---|
| 3,017,462 | 1/1962 | Clark et al. | 178/6.6 |
| 3,141,065 | 7/1964 | Luther et al. | 178/6.6 |

*Primary Examiner*—Terrell W. Fears
*Assistant Examiner*—Steven B. Pokotilow
*Attorney*—Edward J. Norton

[57] ABSTRACT

There is disclosed a technique for use in a recorder-reproducer system to provide synchronization between video information playback of the system and a local video information source. In the arrangement provided, a synchronizing signal which is produced from a first control track signal of the system, is phase compared with a reference signal from the local source. The first control track signal is one which can have one of many phase relationships with respect to the reference signal, only one of which is the desired one. A second signal from the control track and a signal extracted from the video signal are recovered from the record medium. Both of these signals can provide information as to the desired phase relation between the synchronizing signal and the reference signal. Means are provided for examining the recovered signals, for selecting the one that best defines at that time the desired phase relationship and for utilizing that signal to control the production of the synchronizing signal.

7 Claims, 2 Drawing Figures

Figure 1:
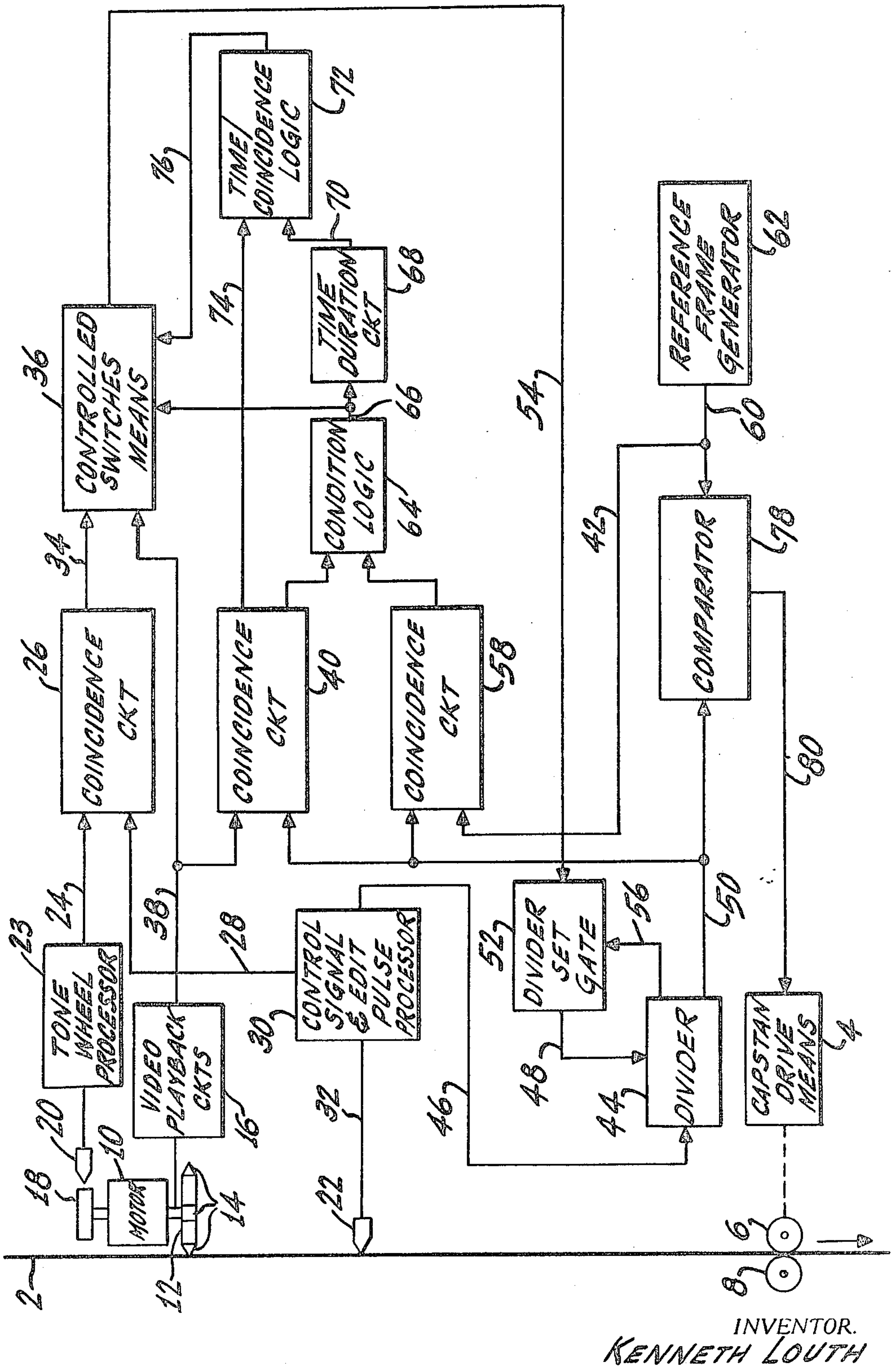

INVENTOR.
KENNETH LOUTH
BY James B. Hayes
Attorney

INVENTOR.
KENNETH LOUTH
BY James B. Hayes
Attorney

VIDEO TAPE RECORDER SYNCHRONIZING SYSTEM

This invention relates to signal synchronization. More particularly, the invention relates to synchronization of signals reproduced from a record medium of a recorder-reproducer system with a reference signal, wherein synchronization is effected in accordance with the status of certain control information obtainable in the recorder-reproducer system.

Video tape recorders and reproducers presently in wide use in commercial television broadcasting are of the transverse track type. Four magnetic heads are spaced 90° apart about the periphery of a headwheel. A motor rotates the headwheel at approximately 14,400 revolutions per minute. A capstan motor drives a magnetic tape at approximately 15 inches per second past the headwheel which rotates in a plane perpendicular to the direction of tape movement. During the recording of a television signal, each magnetic head in turn places a transverse recorded track on the tape. Four transverse tracks are recorded along the length of the tape for each complete rotation of the headwheel.

A control pulse is generated for each complete rotation of the headwheel, which is indicative of the particular time at which a given one of the magnetic heads in the headwheel scans across the tape. The control pulses are formed into a control signal of 240 HZ (cycles per second) which is recorded on a control track located on the edge of the tape. Superimposed upon the 240 HZ control signal is a timing reference pulse derived from the horizontal and vertical sync signals. These timing pulses normally occur at a rate of 30 HZ or once per frame interval and are more commonly known as edit pulses. During recording, 16 tracks are recorded for each television field, making 32 transverse tracks for each television frame. Therefore; eight cycles of the control signal occur per television frame, corresponding to eight full rotations of the headwheel.

In reproducing the recorded signal, the 240 HZ control signal is recovered and phase compared against a local 240 HZ reference or a submultiple of 240 HZ The resulting error signal, indicating the phase error between the recorded control signal and the reference signal, is used to control the speed of the capstan motor in such a manner that the phase error between the two signals is minimized. By this action, if a head designated number one on the headwheel placed track number one on the tape during recording, then head number one scans track number one during reproduction of the recorded signal, and so on.

The above system works satisfactorily where the reproduced television signal is used by itself. However, broadcasting techniques often require that a television signal be formed by switching between a locally generated television signal and a television signal reproduced from a tape. Since eight cycles of the control signal occur per television frame, any effort to use in this manner a television signal reproduced by the above operation, shows that there are eight possible phase relationships that can be established between the 30 HZ television frame rate of a locally generated television signal, and each eight cycle interval of the 240 HZ control signal reproduced from the tape. For each eight cycles of the control signal, only one corresponds to the beginning of a frame in the reproduced television signal.

The satisfactory formation of a television signal from a reproduced television signal and a locally generated television signal, requires that the beginning of a frame in the locally generated television signal occur substantially in synchronism with the beginning of a frame in the reproduced television signal. This occurs when the 30 HZ television frame rate of the locally generated television signal is locked to a signal within the reproducer system which is indicative of the beginning of a frame in the reproduced television signal. In addition to the 240 HZ control signal and the edit pulses, the system playback circuits derives from the recorded horizontal and vertical sync signal, a signal at the frame rate of the video information recorded on the medium. This signal is commonly referred to as the tape frame signal.

It is from these signal sources of information relating to video frames that synchronization may be effected. However, in a modern television recorder-reproducer, particularly those used in broadcasting, initial synchronization must be effected quickly, reliably and as accurately as possible. In addition, upon the occurrence of a disturbance, such as a tape splice or loss of a sync source signal, the effect on playback must be minimized and synchronization restored.

Recalling now the sources of information for performing synchronization, it must be noted that there are certain potential problems in accomplishing fast, reliable and accurate synchronization. For example, the tape frame information coincides with the transition of a recorded frame. However upon initiation of playback this signal is not immediately available. This is due to the fact that the video headwheel is not initially operating at the proper speed. In addition, the tape frame signal when available may be erratic or noisy due to bad tape, slipping tracks or mistracking. The edit pulses which nominally correspond with the recorded video frame are immediately available, if recorded. However these edit pulses may be absent from the tape, recorded at the field rate of 60 HZ instead of the frame rate of 30 HZ, or present but do not correspond with the tape transverse track which includes the tape frame start. As already pointed out, the problem with the 240 HZ control signal is that it occurs eight times during one frame. Therefore, there is only one change in eight of determining the portion of the control signal which corresponds with the limits of the recorded video frame.

In the system of the present invention these eventualities are provided for and circumvented, so as to produce adequate synchronization and minimum playback disruption even for conditions of missing or faulty control information.

It is accordingly an object of the present invention to provide an improved signal synchronizing circuit arrangement useable in a recorder-reproducer system.

A source of a control signal and a source of a reference signal are provided. The control signal is one which can bear any one of several phase relationships with respect to the reference signal, only one of which is desired. The control signal source also provides a first and a second signal either one of which at a given moment in time can provide information as to the particular phase relationships desired between the control signal and the reference signal. Means are provided for processing the control signal and the reference signal in a manner to generate an error signal determined by the phase difference therebetween. The error signal is fed back to the control signal source in a manner to alter the phase of the control signal so as to minimize the error signal. Further means are provided to examine the first and second signals and to select the one of the first and second signals best defining at that time the phase relationship desired between the control signal and the reference signal. The processing means is made responsive to the selected one of the first and second signals to alter the error signal in a manner to establish and maintain the desired phase relationship between the control signal and the reference signal.

Figure 2:
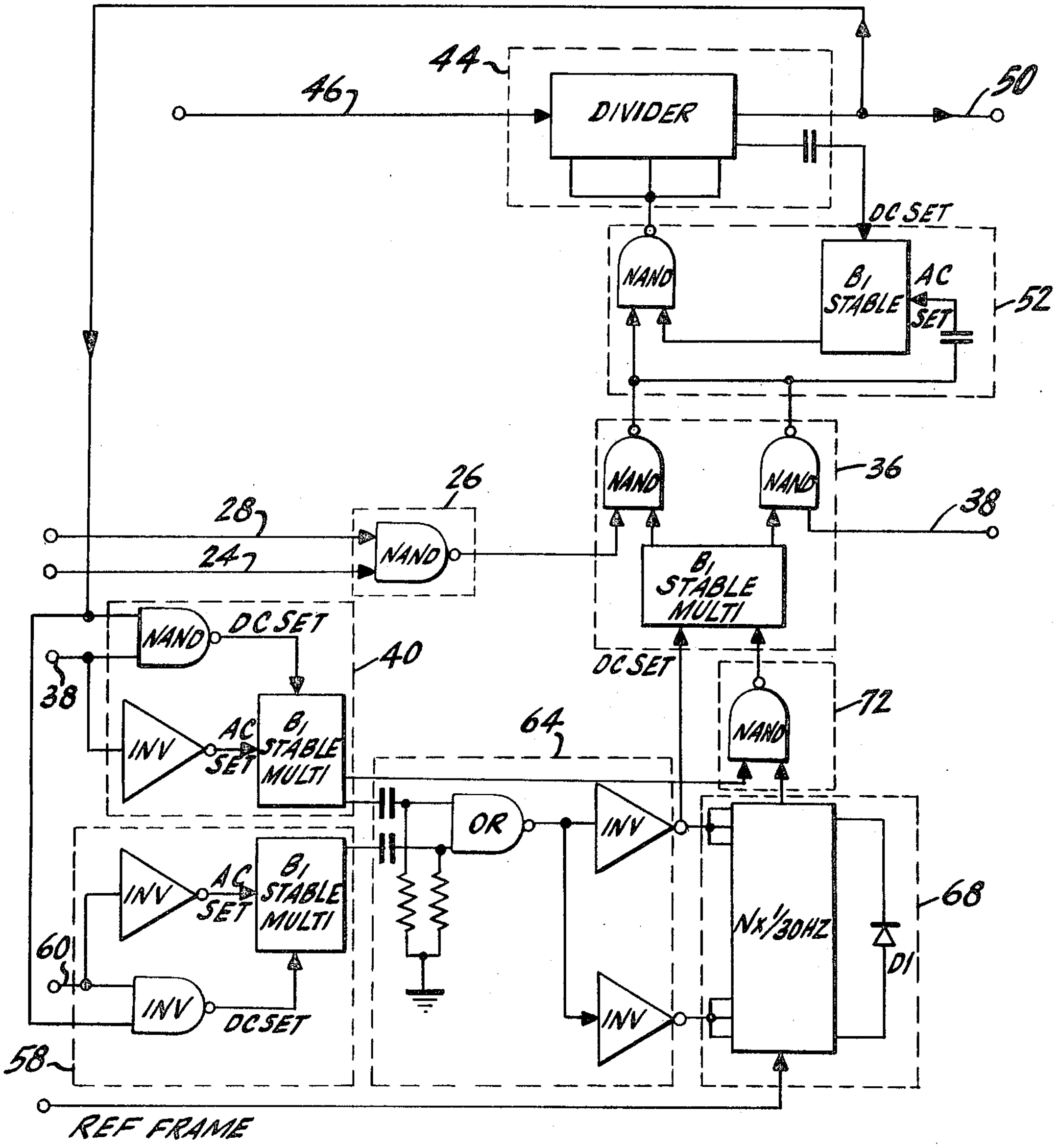

A more detailed description will now be given in connection with the drawing; wherein FIG. 1 is a block diagram of an embodiment of the invention; and FIG. 2 is a more detailed block diagram of a portion of the embodiment of FIG. 1.

Referring to FIG. 1, there is shown a recording medium 2 upon which a video signal has been recorded using a transverse scan technique. Also recorded longitudinally along one edge of the medium are the control signal at 240 HZ, for example, and edit pulses. The structure required to reproduce the recorded signal and pulse information is shown in a greatly simplified manner in FIG. 1. The details of the tape transport are similar to those of equipment now used extensively in the art and, for reasons of simplicity and clarity, are not presented herein.

In FIG. 1, a drive means 4 is coupled to the capstan 6 for driving the record medium 2, between the capstan 6 and a pinch roller 8, in the direction of the arrow. The record medium 2 may be arranged in an endless loop or suitable supply and takeup reels (not shown) may be provided. A headwheel motor 10 causes the headwheel 12 to rotate in a plane perpendicular to the direction of the medium 2 movement. The headwheel 12 preferably has four magnetic heads 14 spaced 90° apart about the periphery thereof. The magnetic heads 14 engage the record medium 2 in turn, thereby scanning in time sequence across the width of the medium 2. The video or television signals reproduced from the transverse tracks on the medium 2 by the heads 14 are fed to video playback circuits 16.

The headwheel motor 10 also causes a tone wheel 18 to rotate with the headwheel 12. The tone wheel 18 may be constructed of magnetically susceptible material with a notch or aperture therein. Each time the notch passes a pick-up device 20, a pulse is generated. In this or a similar manner, a single pulse is generated for each complete revolution of the headwheel 12. The tone wheel 18 is designed by positioning the notch on the tone wheel 18 with respect to the position of the heads 14 on the head-wheel 12, so that the pulse produced one each revolution indicates when a particular one of the heads 14 is scanning across the medium 2. A control track head 22, spaced down the medium 2 from the headwheel 12, reproduces the recorded control signal and edit pulses from one edge of the medium 2 during the reproduction of the recorded television signal.

The tone wheel 18 and pickup device 20 are arranged to provide an output to a tone wheel processor 23. The tone wheel processor 23 provides an output pulse on lead 24 which is present during the scanning of the medium 2 by a particular one of the heads 14. Preferably this is made to be the head 14 which recorded the video track containing the transition from one television frame to another. The head identity signal on lead 24 is coupled as one input to a coincidence circuit 26. A second input to circuit 26 is the edit pulses on lead 28, which are provided as a first output of the control signal and edit pulse processor 30. The control signal and edit pulses are supplied to the processor 30 from the head 22 over lead 32. The output of coincidence circuit 26 is coupled via lead 34 as a first input to a controlled switching means 36. The coincidence circuit 26 is arranged to produce an output signal with the frequency of the edit pulse input when there is detected coincidence, and no output when there is non-coincidence of the inputs. The video playback circuits 16 extract the tape frame signal from the video signal played back by the headwheel 12. The tape frame signal, which corresponds to a transition from one video frame to another on the medium, is coupled via lead 38 as a second signal input to the controlled switching means 36. The tape frame signal on lead 38 is also coupled as one input to a coincidence circuit 40.

A second input to the circuit 40 is provided on lead 42 from an output of the divider means 44. The divider means 44 is a circuit which produces an output pulse for a given number of input pulses applied thereto. The circuit 44 may be for example a series of flip-flop circuits interconnected as a counter. The signal input of the divider 44 on lead 46 which is to be divided, is provided by the control signal and edit pulse processor 30. The processor 30 converts the 240 HZ continuous control track signal from head 22 to a 240 HZ pulse train on lead 46. The cyclic operation or initiation of repetitive divide sequence by the circuit 44 is controlled by the set signal on lead 48. Since the input signal on lead 46 has a nominal rate of 240 HZ, preferably the circuit 44 is made to divide the input by the factor eight thereby producing an output pulse train on lead 50 of 30 HZ. The divide control on lead 48 is provided by the divide set gate circuit 52, which for example may comprise a flip-flop and gate circuits well known in the art. The signal input to gate 52 is provided on lead 54 from the output of switching means 36. The gate 52 is enabled to pass the signal on lead 54 to the divider 44, by the gate control signal input on lead 56. The signal on lead 56 indicates that the division operation in progress is being completed. The lead 56 signal opens the gate 52 which passes the next pulse on lead 54, and the gate 52 is disabled until the next enable signal on lead 56.

A coincidence circuit 58 is provided with a first input from the divider 44 on lead 42, and a second input on lead 60 from the reference frame generator 62. The reference frame generator 62 provides a pulse train, preferably at the 30 HZ frame rate of a local video signal, with which the operation of the recorder-reproducer system is to be synchronized.

The output of coincidence circuit 58 which indicates whether or not there is a contemperaneous occurrence of the inputs to the circuit 58, is coupled as a first input to the condition logic means 64. A first output of the coincidence circuit 40 which indicates whether or not there is a contemperaneous occurrence of the inputs of the circuit 40, is coupled as a second input to the condition logic means 64. The logic means 64, which for example may comprise a differentiator and driver circuit produces an output on lead 66, upon the sensing of a condition change from coincidence to non-coincidence of either of the coincidence circuits 40 or 58. The output on lead 66, provides a first control signal to the switching means 36. The presence of a signal input on lead 66 is arranged to cause the switching means 36, to be disposed to provide its edit pulse input signal on lead 34 as an output an lead 54.

The output of condition logic means 64 on lead 66 is also coupled to a time duration generating means 68. The time duration means 68 may for example be a retriggerable monostable flip-flop or a resettable counter. The time duration means 68 provides an output preferably one second after receipt of an input signal on lead 66. Therefore if the signal on lead 66 occurs more frequently than one second, the time of occurrence of the output of the circuit 68 will be extended, until one second following the receipt of the latest signal input on lead 66. The output of time duration means 68 is coupled on lead 70 as one input to a time/coincidence logic means 72. A second input to the logic means 72 is provided on lead 74 from the coincidence circuit 40. The signal on lead 74 is present when there is non-coincidence between the inputs of the circuit 40. The logic means 72, which for example may comprise simple binary gating, provides an output whenever the signals on lead 70 and 74 occur contemporaneously. That is the time coincidence logic means 72 provides an output, whenever there has been non-coincidence between the divider 44 output and the tape frame signal on lead 38 for a period of 1 second. The output of logic means 72 is coupled on lead 76 as a second input to the controlled switching means 36. The presence of a signal input on lead 76 is arranged to cause the switching means 36, to be disposed to provide its tape frame signal input on lead 38 as an output on lead 54.

The divided control signal on lead 50 from the output of divider 44, and the output of the reference frame generator 62 are coupled as inputs to a comparator 78. The comparator 78 is preferably a phase comparator arranged to produce a phase error signal in response to the input signals applied thereto on leads 50 and 60. The error signal is fed via lead 80 to the capstan drive means 4. The drive means 4 controls the movement of the capstan 6 in accordance with the phase error signal from the comparator 78.

The synchronization of a video signal recorded on the record medium 2 with a local television signal, by using the system of FIG. 1 constructed according to the invention, will now be described. Upon initiation of playback by the system, power is first applied to the capstan drive means 4 and the headwheel motor 10. The capstan 6 drives the medium 2 in the direction of the arrow shown. At this initial phase of playback, the system is in a transient condition with the medium 2 and headwheel 12 coming up to operating speed. During this period, either or both of the coincidence circuits 40 and 58 will indicate non-coincidence between the divider 44 output and the inputs to the circuits 40 and 58. This lack of coincidence is sensed by the condition logic 64 which provides an output on lead 66, which causes the switching means 36 to couple the edit pulses on lead 34 to the divider set gate 52. In the interim, the divider 44 divides down by eight, translating the 240 HZ pulse train control signal on lead 46 to a 30 HZ output on lead 50. This 30 HZ signal is compared with the reference frame 30 HZ signal. The resultant error signal on lead 80 causes the capstan 6 to servo the medium 2 to cause phase coincidence between the divided control signal and reference frame. However there is only one chance in eight, that the divider 44 output coincides with the transition of a frame on the medium 2. Therefore, the system is most likely locked to the wrong indication of a frame transition on the medium 2.

The ending of the next divider 44 operation, enables the set gate 52 to pass the edit pulse for setting the beginning of a divide by eight cycle. It is assumed for the discussion thus far, that edit pulses are present in the control track on the medium 2, are of the correct frequency, and are phased correctly with respect to the video track containing the frame transition. The output of the divider 44 next following the edit pulse set of the divider, therefore will coincide with the actual frame transition on the medium 2. The one out of eight ambiguity problem just mentioned is therefore resolved. The error signal thus developed from the comparator 78 will therefore servo the medium 2 by means of the capstan 6, to cause synchronization between the video frames played back by the reproducing system and the frame occurrence as represented by the frequency of the reference generator 62.

Now let it be assumed that there are edit pulses on the medium 2. However they are of incorrect frequency. That is, the edit pulses were recorded at say the field rate of 60 HZ, instead of the proper frame rate of 30 HZ. Again the initial lock up sequence would be the same as described above. However now there is a 50 percent chance that the lock up is to the desired field which coincides with the start of a frame, rather than the undesired second field of the frame. If lock up is to the wrong edit pulse the following sequence will occur. After lock-up, the coincidence circuit 58 will indicate coincidence of the divider output with the reference frame from the generator 62. However, the coincidence circuit 40 will indicate a non-coincidence between the divider 44 output and its tape frame signal, which is now available from the playback circuits 16 on input lead 38. This occurs since the tape frame occurrences correspond to the occurrence of the correct edit pulse at the frame transition time, whereas the system, in particular the divider, is being set or locked to the wrong edit pulse which occurs during the middle of the frame. The condition logic means 64 senses this non-coincidence condition and enables the one second time duration circuit 68. At the end of one second, the time duration circuit 68 provides an indication of the end of the one second period to the time coincidence logic 72. The output on lead 74 from the circuit 40 will continue to indicate a non-coincidence of tape frame and the divider 44 output. This combination of inputs to the logic 72, causes an output signal on lead 76 to the switching means 36. The signal on lead 76 causes the switching means 36 to couple the tape frame signal now on lead 38 as an output to the divider set gate 52. At the ending of the next divide operation of the divider 44, the set gate 52 will enable the tape frame signal to initiate a new divide cycle. The comparator 78 and capstan drive means 4 will then servo the capstan, until coincidence occurs between the divider 44 output and the reference frame signal of generator 62. During this servoing action the coincidence circuit 58 will indicate there is no longer coindicence between reference frame and the divider 44 output. The output of circuit 58 will be sensed by the condition logic 64, which will output a signal to the switching means 36, causing it to again couple the edit pulses on lead 34 to the divider set gate 52. Now the divider 44 has been set once by the 30 HZ tape frame signal. This will cause the set gate 52 to be enabled to pass an edit pulse from the switching means 36, which occurs at the time of the frame transition field rather than the start of the second field of a frame. The output of the divider 44 is therefore now controlled by the desired one of the 60 HZ edit pulses. This output is compared with the reference frame from the generator 62 and the capstan again servoed for coincidence frame playback with the reference frame information. Thus the playback is correctly synchronized with the reference frame, although edit pulses with an incorrect frequency were originally recorded on the medium 2.

Now let it be assumed that there are no edit pulses at all recorded on the medium 2. With no edit pulses present on the medium 2, there is no input on lead 28 to the coincidence circuit 26. The circuit 26 therefore senses no coincidence between the edit pulse input on lead 28 and the head identity signal on lead 24. There is thus no pulse output on lead 34 to switching means 36. At this time the switching means 36 is now conditioned, as first described above in the operating sequence, to couple the signal on lead 34 to the set gate 52 on lead 54. Since as just mentioned there is no signal input on lead 34 to the switching means 36, no signal is present on lead 54 to control the divider 44. Under this condition the system again has only one chance in eight of locking or synchronizing to the correct one of the control signal occurrences on lead 46 that corresponds to the frame transition. If the output of the divider 44 is wrong, the comparator 78 and capstan drive 4 will servo the system for coincidence with the reference frame from generator 62. The coincidence circuit 58 will therefore indicate coincidence between reference frame and the divider 44 output. However, the coincidence circuit 40 will indicate non-coincidence between the tape frame information on lead 38 from the medium 2 and the divider 44 output. This non-coincidence condition of circuit 40, will cause the condition logic 64 to set the time duration circuit 68. At the end of the one second time duration, the time coincidence logic 72 will sense a continued non-coincidence condition of circuit 44 on lead 74. The logic 72 will therefore output a signal to the switching means 36, which causes it to couple the tape frame signals on lead 38 to the divider set gate 52. At the ending of the next dividing cycle of the divider 44, the tape frame signal will be passed by the gate 52 and will set the divider to output a signal on the completion of the next cycle, which corresponds with the correct one of eight possible timed outputs of the divider 44. The comparator 78 and capstan drive 4 will reservo the system for correct coincidence with the reference frame from generator 62. During this servoing the coincidence circuit 58 will again indicate non-coincidence, causing the condition logic 64 to output a signal to switching means 36, which again couples the input lead 34 to the output lead 54. Again there may be no edit pulse signal available from coincidence circuit 26. However the interim use of the tape frame signal to set the divider 44, will have resolved the one of eight ambiguity problem and the system will stay properly synchronized in the absence of a disturbance.

If a disturbance occurs, for example, a shifting of the tape frame signals from the medium 2 due to a splice, the coincidence circuit 40 will sense the change. The coincidence circuit will cause the condition logic 64 to set the time duration 68. If the disturbance continues for more than a second, as is likely with a splice, the time coincidence logic 72 will cause the switching means 36 to switch. The sequence of setting of the divider 44 and reservoing of the system just described, will again take place and synchronization of the system with the new tape frame information will be accomplished.

If the disturbance is due to say a dropout, which is usually only instantaneous, the time coincidence logic 72 will not output a signal to switching means 36. This is so since there will no longer be a non-coincidence indication on lead 74 from the circuit 40 at the end of the one second duration. Thus for only an instantaneous disturbance or continuing instantaneous interruption such as might be due to mistracking of the heads 14 along the recorded tracks, playback continues uninterrupted since a reservoing of the playback system does not occur.

Now let it be assumed that edit pulses are present at the correct frequency 30 HZ. on the medium 2, but they are phased incorrectly. That is, they were not recorded at the time when a particular head 14 on the headwheel 12, recorded the track on the medium 2 which contains the transition from one frame to the next. Allowing synchronization of the system by such edit pulses, would cause playback to be synchronized to some intermediate portion of a frame, rather than the desired frame transition portion. This problem is prevented by the operation of the coincidence circuit 26. The head identity input on lead 24 to the circuit 26 is arranged to occur every time the head 14, which recorded the track containing the frame transition, scans the medium 2 in playback. Therefore the coincidence circuit 26 senses when the edit pulses on lead 28 are other than during the track containing the frame transition. For this condition, no output is present on lead 34 from the coincidence circuit 26 to the switching means 36. This situation is sensed by the system as being the same case as where no edit pulses were present, and the operation of the system is as just described for the case of no edit pulses present on the medium 2. Thus where incorrectly phased edit pulses were recorded, edit pulses are not permitted to control synchronization of the system unless and until the coincidence circuit 26 senses that correctly phased edit pulses are present. In the interim as just described above, the tape frame signal from the medium will be used to accomplish proper synchronization.

Finally it is assumed that desired edit pulses are not present on the medium 2 and that as described tape frame signals are to be utilized for synchronization. If under this condition the tape frame signals are noisy or unreliable, and continue to be so for more than a one second duration, they are precluded from controlling the synchronization of the system. The reason for this is that permitting utilization of continued undesirable tape frame signals, would cause continuous attempts by the system to reservo and synchronize with the noisy and changing tape frame information. This would cause continuous disruption of signal playback from the medium, and little useful benefit could be derived from the played back information. Instead, tape frame control is inhibited and the system is enabled to self lock on one of the possible eight cycles of the control signal on lead 46. For seven of the eight possible lock-ups, an initial single flip of the playback information will occur upon switching between local video information and playback video from the reproducer system. However, following this initial flip playback will remain stable and synchronized, since the system will not continue to attempt to resynchronize to unreliable tape frame information.

This is accomplished through the action of the coincidence circuit 40 during the one second interval of the time duration circuit 68, which was initiated by the original non-coincidence sensed by the circuit 40. Statistically during the one second interval, at least one of the noisy mutating tape frame signals will appear to be coincident with the divider 44 output. As the tape frame signal is unreliable, this momentary coincidence is not stable and therefore again becomes non-coincident. This transition non-coincidence is sensed by the condition logic 64, which outputs a signal to the time duration circuit 68. Each such input to the time duration circuit 68, restarts and thus extends the time duration measured by the circuit 68. Thus during the undesirable condition of the tape frame signal, the time coincidence logic 72 is not enabled to cause the switching means 36 to couple tape frame signals to the divider set gate 52. If the tape frame signals then do become useable, the period of the time duration circuit 68 is no longer extended or perpetuated. At the expiration of one second from the last output of the condition logic 64 to the time duration circuit 68, the time coincidence logic 72 enables the switching means to pass the tape frame signals to the set gate 52.

If reference is made to FIG. 2, there is shown in block form, particular circuits which may be utilized for the corresponding portions of the system of FIG. 1. The cooperative operation of the circuits shown is the same as that described for the corresponding portions of the system of FIG. 1.

In FIG. 2, the block 68 is shown as resettable divider counter providing a count of $N$, (where $N = 30$) times one-thirtieth HZ. or a one second interval. A clocking pulse input to the counter 68, for example, the 30 HZ. reference frame from generator 62 in FIG. 1, is provided. It is again noted that the time duration circuit 68, may be resettable mono-stable multivibrator which has a basic astable period of one second.

While the invention has been described in connection with its use in a particular type of signal recorder reproducer, the invention may be utilized in any type of signal recorder reproducer, television or non-television, where stability of the reproduced signal is desired.

I claim:

1. A synchronization system, comprising: a reference signal source and a control signal source, said control signal source providing a control signal and two synchronizing signals containing information of varying quality about a desired phase relation from several possible phase relations between the control signal and the reference signal, first circuit means responsive to said control signal to derive an auxiliary signal from said control signal with the phase of said auxiliary signal being determined by a further input signal applied to said first circuit means, signal selecting means having said first and second synchronizing signals applied thereto, said selecting means including means responsive to the phase of said auxiliary signal with respect to said reference signal and one of said synchronizing signals applied thereto, to provide as said further input signal to said first circuit means one of said synchronizing signals when said auxiliary signal remains out of phase with respect to said reference signal for a predetermined time interval, and to provide the other of said synchronizing signals when said auxiliary signal remains out of phase with respect to said other synchronizing signal for a predetermined time interval, additional circuit means generating an error signal from a phase comparison between said reference signal and said auxiliary signal, and means responsive to said error signal for controlling said control signal so that said auxiliary signal is phase locked to said reference signal.

2. In a system for recording and reproducing video signals from a record medium, an arrangement for synchronizing the reproduction of said video signal with a reference signal, comprising:

means including a first signal transducing means for providing from a longitudinal track of said record medium, a control signal at a frequency which is a multiple of said reference signal and a first signal indicative of the frame transitions of said video signal on said medium;

means including a second signal transducing means which scans said medium, to provide from said video signal a second signal indicative of the frame transitions of said video signal;

circuit means for providing from said control signal a further signal timed in response to one of said first and second frame transition indicating signals;

means for processing said further signal and said reference signal in a manner to generate an error signal determined by the timing difference therebetween;

means for controlling the movement of said record medium in response to said error signal;

coincidence detecting means responsive to said reference signal, said further signal and said second frame transition signal being applied thereto, for providing a first output when said further signal is not coincident with one of said reference signal and said second frame transition signal, said coincidence detecting means including means for providing a second output when said further signal is not coincident with said second frame transition signal for a predetermined time interval; and signal selecting means coupled to said coincidence detecting means and having said first and second frame transition signals applied thereto, said selecting means being operative to apply to said circuit means, said first frame transition signal in response to said first output of said coincidence detecting means and said second frame transition signal in response to said second output thereof.

3. In a system for reproducing signals from a recording medium said system having, a rotatable means for reproducing from a first portion of said medium a video signal including a first pulse train whose frequency is indicative of the frame transitions of said video signal, means for reproducing from a second portion of said medium a second signal separate from said video signal including a control signal and a second pulse train whose frequency is also indicative of the frame transitions of said video signal, means associated with said first reproducing means for providing a third signal indicative of the rotary position of said first reproducing means with respect to said medium, means coupled to said second reproducing means for providing a third pulse train with the frequency of said control signal and means for moving said medium relative to said reproducing means, an arrangement for synchronizing the reproduction of said video signal with the output of a reference signal means, comprising:

circuit means arranged to produce an output pulse for a given number of input pulses applied thereto;

means for applying said third pulse train as an input to said circuit means;

means for applying a fourth signal to said circuit means to control the operation of said circuit means in accordance with said fourth signal;

means responsive to said second pulse train and said third signal for detecting coincidence of occurrence therebetween;

means for providing a selected one of said output of said detecting means and said first pulse train as said fourth signal to said circuit means;

logic means for controlling the operation of said selective means in response to the condition of said reference signal and said first pulse train with respect to said output of said circuit means;

said comparing means being arranged to produce an error signal determined by the phase difference between said reference signal and the output of said circuit means; and means responsive to said error signal for operating said medium moving means to control the speed of said medium past said reproducing means.

4. In a system for reproducing signals recorded on a recording medium having, rotatable means for reproducing from a first portion of said medium a video signal including a first train of pulses which are indicative of the frame transitions of said video signal, means for reproducing from a second portion of said medium a control signal and a second train of pulses which are indicative of the frame intervals of said video signal, said control signal being a multiple of the frequency of an external reference signal and having any one of several phase relationships with respect to said reference signal, only one of said phase relationships being a desired one, and means for moving said medium relative to said reproducing means, an arrangement for synchronizing the reproduction of said video signal with said external reference signal, comprising:

means coupled to said rotatable reproducing means to provide a third signal indicative of the rotary position of said rotatable reproducing means with respect to said medium;

first detecting means responsive to said second pulse train and said third signal to provide an output indicative of the coincidence of the inputs thereof;

circuit means arranged to cyclicly produce an output pulse for a given number of input pulses applied thereto;

means responsive to said control signal for providing a third pulse train with the frequency of said control signal;

means for applying said third pulse train to the input of said circuit means;

switching means responsive to said first pulse train and the output of said first coincidence detecting means for selectively providing an output;

means to apply the output of said switching means to said circuit means to control the cyclic operation of said circuit means;

second detecting means responsive to said reference signal and an output of said circuit means to provide an output indicative of the coincidence of the inputs thereof;

third detecting means responsive to said first pulse train and an output of said circuit means to provide a first output indicative of the coincidence of the inputs thereof and a second output only when there is a lack of coincidence between the inputs thereof;

first logic means coupled to an output of said second and third coincidence detecting means to provide a second control signal to said switching means;

timing means coupled to the output of said first logic means and responsive to said second control signal;

second logic means coupled to said second output of said third coincidence detecting means and said timing means to provide a third control signal to said switching means;

comparing means;

means to apply said reference signal to said comparing means;

means to apply the output signal of said circuit means to said comparing means;

said comparing means being arranged to produce an error signal determined by the phase difference between said reference signal and the output of said circuit means; and means responsive to said error signal for operating said medium moving means to control the speed of said medium past said reproducing means.

5. The invention according to claim 4, wherein; said means to apply the output of said switching means to said circuit means, includes gating means interposed between said above mentioned means, with said gating means being enabled by the output of said circuit means.

6. the invention according to claim 4, wherein; said first logic means includes circuit means providing an output indicative of a change in the coincidence condition sensed by said second and third detecting means.

7. The invention according to claim 4, wherein; said timing means includes means resettable for extending the period determined by said timing means.

* * * * *